UNITED STATES PATENT OFFICE.

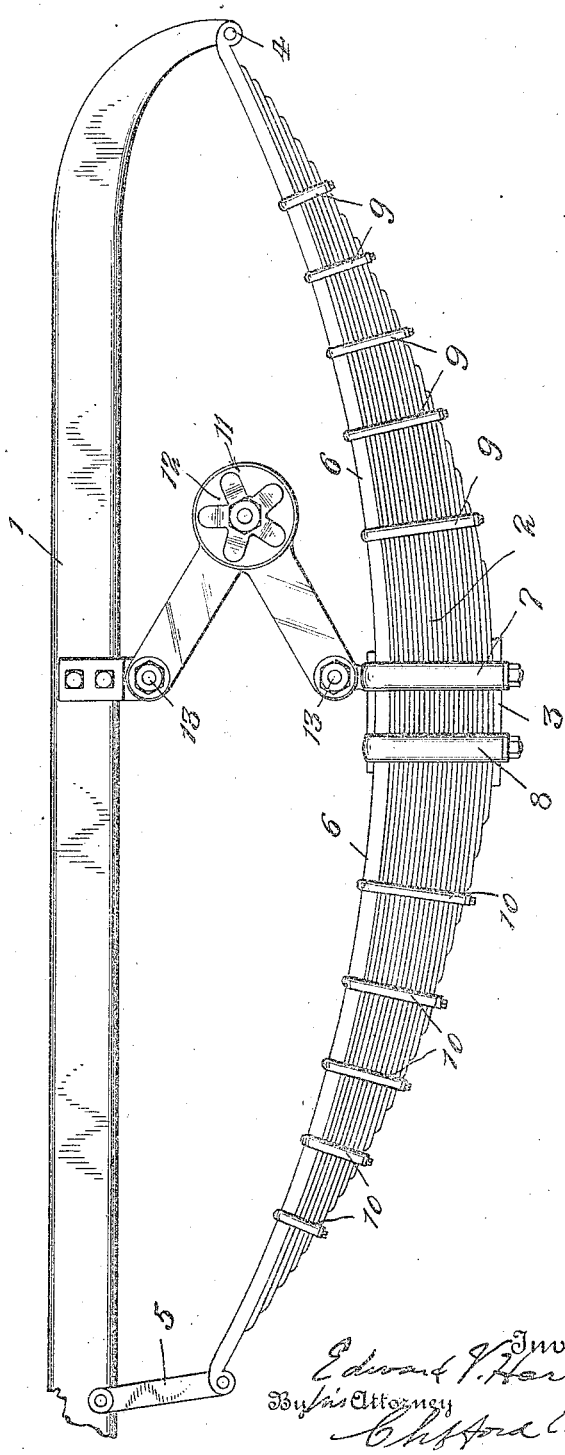

EDWARD V. HARTFORD, OF DEAL, NEW JERSEY.

SUSPENSION DEVICE FOR VEHICLES.

1,154,569.  Specification of Letters Patent.  Patented Sept. 21, 1915.

Application filed March 1, 1912. Serial No. 680,849.

*To all whom it may concern:*

Be it known that I, EDWARD V. HARTFORD, a citizen of the United States, residing at Deal, in the county of Monmouth and State of New Jersey, have invented certain new and useful Improvements in Suspension Devices for Vehicles, of which the following is a full, clear, and exact specification.

My invention relates to certain new and useful improvements in suspension devices for vehicles and especially to automobiles and other power-driven cars.

Prior to my invention it was customary to interpose between the running gear and body portion of vehicles, an elastic supporting device usually consisting of one or more springs of various types. The purpose of such springs has been to prevent, as far as possible, the direct transmission to the body of shocks to which the running gear is subjected when striking obstructions, depressions or other inequalities in the road, and while the springs heretofore used have in a measure served this purpose, reducing or modifying the shock, they have not been entirely successful. Furthermore, while the springs heretofore used prevented the immediate transmission of the direct vibration, they have, by reason of their construction and inherent defects, caused secondary shocks or vibrations to be impressed upon the carrying portion of the vehicle, which in a measure are just as undesirable as the original shock to which the running gear is subjected.

It is obvious that when, in the running of a vehicle, the body is permitted to travel in a substantially horizontal plane and any movement therefrom takes place gradually, shocks would not be produced, and it is a main object of my invention to produce a suspension device for interposition between the running gear and body of a vehicle which will approximate this result.

The particular embodiment of my invention which I prefer to employ and one form of which is illustrated and described in the drawings and accompanying specification, consists of a spring of peculiar construction which possesses the characteristics of not only having a relatively long period of vibration, but a varying period of vibration, depending, to some extent at least, upon the amount of rise and fall to which the wheels are subjected and thus to the varying movement impressed upon the spring. That is, my preferred form of spring, under comparatively small impulses, has an extremely long period of vibration, while increased impulses and movements tend to shorten the period of vibration and thus accommodate themselves to the condition of the road over which the vehicle is traveling.

I have found that a large part of the inherent objectionable shocks to which the body of a vehicle is subjected is due to the fact that the period of vibration of the spring is too short. That is, the reaction of the spring resulting from the primary distorting shock occurs too quickly, and before the running gear can assume its normal position. For instance, when a vehicle is running over an uneven road at moderate speed and the wheel strikes an obstruction, the wheel rises, compressing the spring, and before it can drop over the obstruction and thus relieve the excessive tension of the spring, the latter has reacted and exerted its force upwardly upon the body, thus delivering thereto a secondary shock. If the spring action were slow enough substantially to synchronize with the rise and fall of the wheel, the reaction of the spring would be substantially consumed downwardly and thus no movement or shock to the body would result.

Another feature of my invention consists in combining with the special form of spring hereinafter described, a spring-retarding or controlling device.

In the drawings illustrating one form of my invention, the numeral 1 indicates the side-frame of the body-portion of a vehicle, and 2 a semi-elliptic suspension spring adapted to be secured at or near its center 3, to the running gear in any suitable manner. As illustrated the spring is adapted to be connected to the side-frame by a pivotal connection 4, at one end, and by a link 5, at the other. The spring proper consists of an upper or master leaf 6, which constitutes the longest leaf of the spring, and its cross-sectional dimension will depend upon the load and character of the service for which the spring is intended. In addition to this master leaf, the spring comprises a multiplicity of comparatively thinner leaves progressively shorter, that is, decreasing in length from top to bottom leaf, and said leaves are clamped together at or near their center by means of clamps 7 and 8, as shown. In addition, a plurality of clips 9 and 10 are disposed upon either side of the main clips 7 and 8, and serve to hold the several leaves together at predetermined points between the center and ends of the spring.

In the drawing, 11 illustrates a spring-retarding device or shock absorber, which may be of any desired character, the illustrated form being that of a toggle mechanism having friction joints at the center 12 and ends 13 thereof. This construction is so well known that it need not be further illustrated or described.

In constructing and operating my invention the master leaf of the spring, as stated, is designed and its size determined according to the service conditions intended. This leaf, having a given length and thickness, has a given period or time of vibration. The remaining leaves, while shorter, are comparatively thin and as the period of vibration depends in part upon their cross-sectional dimension, the leaf adjacent the master leaf is very much slower in operation. Being thin, the lower leaves vary considerably from each other in their period of oscillation and if permitted to vibrate independently, the several leaves of the entire spring would differ very widely in time of vibration. I have found, however, that by securing them together by any suitable means so as to control their individual operation by each other, that the period of vibration of the component spring is comparatively very slow, its period of vibration being a modified component of the several leaves brought into operation, and as the shock or primary impulse to which the spring is subjected varies in strength, varying numbers of leaves are brought into operation. The greater the shock or initial impulse, the faster will be the rebound or recoil of the spring, as more of the short leaves will be brought into operation. Thus, when a vehicle equipped with my spring passes over an obstruction at comparatively slow speed, but a few of the upper leaves will be compressed, and it will rebound slowly, but as the speed of the vehicle increases and the initial shock or impulse increases, more leaves are brought into operation and the quicker will be the rebound. Thus the period of vibration of the whole spring tends to conform to the speed of the vehicle and to the amount of initial shock experienced, and the result is that the vehicle rides easily at low or at high speeds.

In some cases I have found that exceptionally good results can be obtained by the use of a spring constructed as thus described, combined with an additional retarding device, and I have found that when such additional retarding means is used, it is possible to employ springs so thin and flexible as to be impracticable for service conditions when uncontrolled.

It is obvious that many modifications and changes may be made in my invention without departing from the spirit thereof and I do not mean to limit myself to any particular form, but

What I claim and desire to secure by Letters Patent is:

1. A suspension device for vehicles comprising a plurality of leaves having its longest leaf of greater thickness than the remaining leaves and provided with means for securing it to one portion of a vehicle, a multiplicity of leaves much thinner than the master leaf and of progressively decreasing length, disposed upon the convex surface of said master leaf means for connecting all the leaves at their center and additional means for connecting a plurality of the leaves at a plurality of points intermediate their center and ends.

2. A spring comprising a master-leaf and a plurality of very thin supplemental leaves progressively shorter than said master-leaf and clipped thereto, so as to insure positive co-action therewith, said supplemental leaves being disposed beneath said master-leaf, the arrangement thereof being such as to render certain of said supplemental leaves operative in sequence, the number brought into action and the extent of operation being governed by the impact delivered to the spring.

3. A suspension device for vehicles comprising a master-leaf adapted to be pivoted to a vehicle at one end, its other extremity having a link connection with said vehicle part, a plurality of supplemental leaves of much thinner material and progressively shorter than said master-leaf, disposed upon one surface thereof means for maintaining all of said leaves in frictional contact, said means consisting of a plurality of clips disposed intermediate of the ends of said master spring, whereby the oscillation of said spring and the movement of its component leaves with relation to each other, and the frictional resistance therebetween, will be governed by the force of an impact delivered thereto, and means for modifying the vibration of the spring under certain conditions.

4. A spring for vehicles comprising a master-leaf, and a multiplicity of progressively shorter and thinner leaves of greater individual resiliency than said master-leaf and disposed upon one surface thereof, whereby the period of oscillation of the component spring will be a modified component of the leaves brought into operation by the force of an impact upon the spring.

5. A suspension device for vehicles, comprising a master leaf adapted to be pivoted to a vehicle at one end, its other extremity having a link connection with said vehicle part, a plurality of supplemental leaves of thinner material and progressively shorter than said master leaf, and means for maintaining all of said leaves in engagement, said means consisting of a pair of clamps located intermediate of the ends of said master leaf and embracing all of said leaves, and a plurality of clips of graduated sizes located intermediate of each end of said master leaf and said centrally located clamps, said clips being supported by said master leaf and embracing certain of said supplemental leaves, said clamps and said clips coöperating to maintain all of said leaves in close frictional contact.

6. A suspension device for vehicles comprising a master leaf adapted to be pivoted to a vehicle at one end, its other extremity having a link connection with said vehicle part, a plurality of supplemental leaves of thinner material and progressively shorter than said master leaf, and means for maintaining all of said leaves in frictional contact, said means consisting of a pair of clamps located intermediate of the ends of said master leaf and embracing all of said leaves and a plurality of clips, supported from said master leaf, intermediate of the ends thereof and said central clamps, the spaces between said clips decreasing in width toward the ends of said master leaf, each of said clips embracing certain of said supplemental leaves, whereby said leaves will be capable of free movement therein and with relation to each other.

7. A spring for vehicles comprising a thick master leaf, and a multiplicity of supplemental leaves of graduated lengths disposed upon one surface of said master leaf, and connected thereto, each supplemental leaf being formed of very thin material, whereby the spring action of said supplemental leaves will coöperate with and control the functioning of the master leaf to provide a suspension of varying periods of oscillation, dependent upon the deflection of the spring.

8. A suspension device for vehicles comprising a relatively thick master leaf adapted for connection to the vehicle body and a multiplicity of supplemental leaves formed of very thin material disposed upon one surface of said master leaf and connected thereto, said supplemental leaves serving to control and cushion the flexure of said master leaf, whereby the suspension will have a greater degree of flexibility than that of the master leaf individually.

In witness whereof I have hereunto set my hand in the presence of two subscribing witnesses.

EDWARD V. HARTFORD.

Witnesses:
W. G. WRIGHTSON,
WILLIAM P. MONTGOMERY.